United States Patent Office.

ALFRED MARR, OF LEWISTON, MAINE, ASSIGNOR TO HIMSELF AND GEORGE W. BUCKMAN, OF SAME PLACE.

Letters Patent No. 103,214, dated May 17, 1870.

IMPROVED VARNISH FOR SURFACING RAILWAY-HEADS, DRAWING AND SPINNING-FRAMES.

The Schedule referred to in these Letters Patent and making part of the same

*To all whom it may concern:*

Be it known that I, ALFRED MARR, of Lewiston, in the county of Androscoggin and State of Maine, have invented a new and useful Improvement in Varnish; and I do hereby declare that the following is a full and exact description of the same, reference being had to the accompanying drawings and to the letters of reference marked thereon.

The invention consists of two compounds, formed of certain ingredients hereinafter named, which constitute a varnish intended for use in surfacing the rolls of railway-heads, drawing and spinning-frames.

To enable others to make and use my compounds, I will now proceed to describe the manner of compounding and applying the same.

I use two distinct preparations. The first consists of one pint of vinegar, two hundred grains gum-tragacanth, one ounce linseed-oil, and twenty grains borax. These are cut together, in a closely-corked bottle, at least a week before using.

The second consists of one ounce transparent glue, one hundred and fifty grains American isinglass, and one-half pint vinegar. These should be mixed, heat being applied, at least six hours before using.

From these preparations I prepare two distinct kinds of varnish.

To prepare the first, I take one-half pint of vinegar and add one and a half ounce of the first preparation, and one-half of the entire quantity of the second preparation. When mixed, these are heated nearly to the boiling-point, and six ounces of Venetian red are added, after which it is cooked for half an hour. While this is still warm it should be applied to the rolls by means of a fine sponge. Three coats should be given, permitting a short time to elapse between each coat, to allow them to dry.

To prepare the second, I take the remainder of the second preparation and add to it one-half ounce of the first preparation, and apply, as before, two coats of this varnish.

After drying a few hours the rolls are ready for use.

Having thus fully described the invention,

What I claim as new, and desire to secure by Letters Patent, is—

The compounds herein described, when mixed and applied as described, for the purpose set forth.

This specification signed and witnessed this 21st day of April, 1870.

ALFRED MARR.

Witnesses:
 JOHN SMITH,
 G. W. BUCKMAN.